US010024550B2

(12) United States Patent
McCahill (10) Patent No.: US 10,024,550 B2
(45) Date of Patent: Jul. 17, 2018

(54) ENERGY EFFICIENT THERMALLY DYNAMIC BUILDING DESIGN AND METHOD

(71) Applicant: Gerry McCahill, Napanee (CA)

(72) Inventor: Gerry McCahill, Napanee (CA)

( * ) Notice: Subject to any disclaimer, the term of this patent is extended or adjusted under 35 U.S.C. 154(b) by 1092 days.

(21) Appl. No.: 14/034,882

(22) Filed: Sep. 24, 2013

(65) Prior Publication Data

US 2014/0090801 A1    Apr. 3, 2014

(30) Foreign Application Priority Data

Sep. 28, 2012    (CA) .................... 2791439

(51) Int. Cl.

| F24D 3/14 | (2006.01) |
|---|---|
| E04B 2/00 | (2006.01) |
| F24F 5/00 | (2006.01) |
| F24J 2/00 | (2014.01) |
| E04C 2/52 | (2006.01) |
| F28D 20/00 | (2006.01) |
| F28D 21/00 | (2006.01) |

(52) U.S. Cl.
CPC ................. *F24D 3/14* (2013.01); *E04B 2/00* (2013.01); *E04C 2/525* (2013.01); *F24D 3/147* (2013.01); *F24F 5/0014* (2013.01); *F24F 5/0089* (2013.01); *F24J 2/0007* (2013.01); *F28D 20/0043* (2013.01); *F28D 20/0056* (2013.01); *F28D 21/0012* (2013.01); *F28D 21/0014* (2013.01); *F28D 2020/0008* (2013.01); *F28D 2020/0078* (2013.01); *Y02B 10/20* (2013.01); *Y02B 10/70* (2013.01); *Y02B 30/566* (2013.01); *Y02E 60/142* (2013.01)

(58) Field of Classification Search
CPC ........ F24D 3/14; F24D 3/147; F28D 21/0012; F28D 20/0043; F28D 21/0014; F28D 20/0056; F28D 2020/0008; F28D 2020/0078; E04C 2/525; F24F 5/0014; F24F 5/0089; F24F 3/044; E04B 2/00; F24J 2/0007; Y02E 60/142; Y02B 30/566; Y02B 10/20; Y02B 10/70
USPC ............................................ 126/633; 62/310
See application file for complete search history.

(56) References Cited

U.S. PATENT DOCUMENTS

| 3,343,474 A * | 9/1967 | Sohda ................... E04B 1/7612 454/185 |
|---|---|---|
| 3,893,506 A | 7/1975 | Laing |
| 4,263,765 A | 4/1981 | Maloney |

(Continued)

*Primary Examiner* — Alfred Basichas
(74) *Attorney, Agent, or Firm* — Fay Sharpe LLP (57) ABSTRACT

A heating and cooling system for a building having a passive source of heat energy, a heat sink reservoir to store heat energy in, and a first heat exchange system operating a temperature of 15 degrees Celsius or less and being operatively connected to said reservoir. There is a second heat exchange system operating at a temperature of above 15 degrees Celsius which is also operatively connected to the heat sink reservoir and a thermal mass wall which is connected to the heat exchanger systems. In one aspect, the invention provides a dynamic wall having a first insulating layer on an interior surface of the wall, a thermal mass adjacent to the first insulating layer, a second insulating layer on an outside surface of the thermal mass and a heat exchanger operatively connected to said thermal mass to add or subtract heat from said thermal mass wall.

22 Claims, 4 Drawing Sheets

(56) References Cited

U.S. PATENT DOCUMENTS

| | | | |
|---|---|---|---|
| 4,274,396 A | 6/1981 | Peters et al. | |
| 4,393,861 A * | 7/1983 | Beard | F24D 5/10 |
| | | | 126/620 |
| 4,508,102 A | 4/1985 | Hager | |
| 4,974,382 A * | 12/1990 | Avellanet | E04B 1/78 |
| | | | 428/457 |
| 5,178,206 A * | 1/1993 | Saunders | G05D 23/1923 |
| | | | 165/11.1 |
| 5,595,595 A * | 1/1997 | Glenn | C04B 24/383 |
| | | | 106/672 |
| 5,984,198 A * | 11/1999 | Bennett | F24F 5/0096 |
| | | | 165/140 |
| 6,079,179 A | 6/2000 | Shoemaker, Jr. | |
| 6,220,339 B1 * | 4/2001 | Krecke | F24D 11/003 |
| | | | 126/585 |
| 6,446,625 B1 * | 9/2002 | Tinari | F24J 2/0438 |
| | | | 126/617 |
| 7,028,685 B1 * | 4/2006 | Krecke | E04B 1/74 |
| | | | 126/620 |
| 7,077,124 B2 | 7/2006 | Szymocha | |
| 2005/0056042 A1 * | 3/2005 | Bourne | F24F 3/044 |
| | | | 62/310 |
| 2009/0001185 A1 * | 1/2009 | Kroll | F24D 3/14 |
| | | | 237/60 |
| 2009/0044465 A1 * | 2/2009 | Krecke | E04B 7/22 |
| | | | 52/173.3 |
| 2009/0222981 A1 * | 9/2009 | Hartman | E03B 1/04 |
| | | | 4/313 |
| 2010/0198414 A1 * | 8/2010 | Kroll | F24D 3/14 |
| | | | 700/278 |
| 2010/0318237 A1 * | 12/2010 | Maglaque | G05B 19/0421 |
| | | | 700/295 |
| 2011/0155366 A1 * | 6/2011 | Brunn | F28D 7/024 |
| | | | 165/287 |

* cited by examiner

ENERGY EFFICIENT THERMALLY DYNAMIC BUILDING DESIGN AND METHOD

FIELD OF THE INVENTION

This invention relates generally to the field of green or energy efficient building design, and more particularly to energy efficient building design in which the exterior surfaces of a building, such as a house or other building intended for human occupation, are modified to restrict the heat lost, or the heat gained through the wall by means of, among other things, insulation. Most particularly this invention relates to building structures which include active systems and designs to reduce the energy demand of such buildings as compared to conventional passive designs.

BACKGROUND OF THE INVENTION

Significant energy is required to heat and cool buildings occupied by humans. Subject to the seasons and the weather, buildings located in the south require significant energy to effect cooling and ones in the north can require significant energy for heating. The so called "green" building movement has an interest in the design of buildings which conserve energy required to maintain at a temperature comfortable for human occupation to reduce overall energy demand. With improved energy efficiency, the amount of oil, gas, electrical energy or other energy required to heat and cool such a building can be reduced, thereby reducing the $CO_2$ production and the environmental footprint, as well as the costs of operating the dwelling to the owner.

In general buildings are subject to three types of temperature cycles, all having a different time period. The first cycle is the daily cycle which typically involves increasing temperatures during the day, and decreasing temperatures during the night. For example in Kingston, Ontario the daily cycle is about plus or minus four degrees Celsius on average, although the actual daily extremes can be much larger than the average. The next cycle is a local weather cycle which may last a period of days as warm fronts or cold fronts move through changing the temperature somewhat in the space of a few days. Again, in Kingston the average weekly variation is typically between 20 to 25 degrees Celsius, although again it can be much more or less than that in an extreme case. The longest period temperature changes are imposed by the seasons, which include the transition from the warmth of summer to the cold of winter. Of course to some extent these temperature variations are dependent upon the geographic location of the building, with colder average temperatures, in the northern hemisphere being found the further north the building is located.

Insulation to restrict heat loss, or heat gain, for example, through a building wall or roof is a commonly used building technique at the present. Generally the more the insulation the slower the rate of any heat loss through a wall or the like and the less energy is required to heat or cool the interior of the building to maintain it at a temperature that is comfortable for human habitation. However, even with large amounts of insulation additional energy is still required to make up for heat losses and gains that occur through the walls or other exterior surfaces. In some cases a high mass wall module is provided to act as a thermal energy flywheel for daily temperature fluctuations such as disclosed in U.S. Pat. No. 4,263,765. However such a design does not address the weekly and annual temperature cycles to any extent.

A building structure is subject to certain natural energy which impinges on it. For example, sun and wind energy are available to a greater or lesser extent for all buildings. Attempts have been made in the past to use such naturally occurring energy to help supplement the energy requirements of for example a house, through the use of small windmills or solar panel arrays. However such systems have limitations in the amount of energy they can usefully provide to a conventional building design, in part because there is a mismatch between when the energy is needed (say at night when the outside temperature cools down) and when it can be harvested (during the day when the sun is shining). As well, the amount of energy that is available to be harvested is can be far less than what is required to maintain a desirable temperature within the building in certain seasons. Further such systems can be costly and the cost of such a system can outweigh the energy savings that might otherwise be obtained. As well such systems can be perceived as being technically complex and thus not desirable for the average home owner.

Some prior designs have tried to harvest the energy impinging upon a building structure by incorporated liquid filled tubes located on the exterior surfaces of the outside walls, for example, to absorb the passive solar energy or heat that a building structure may be exposed to. Examples of such systems include the inventions disclosed in the following U.S. Pat. Nos. 4,274,396; 7,077,124; 3,893,506; 4,508,102; 6,079,179 and 6,220,339. In particular, in U.S. Pat. No. 6,220,339, the energy harvested from the outer surface of the exterior walls by means of tubes which act as a heat exchanger. The heat harvested in this way is taken to a heat sink in a basement for example, to be stored for later use. The heat sink may be in the form of a gravel mass, located under the building. After sun set for example the energy can then be recovered from the heat sink and reused to warm the building. To improve efficiency the patent teaches that the heat sink can be divided into a series of zones or regions of different temperatures to limit heat losses. However, this prior patent teaches essentially a passive solar collector to take energy from the outside of the building and to temporarily store it on the inside of the building, without addressing the dynamic of heat loss through the building walls themselves.

What is desired is an efficient building system in which passive or other harvested energy can be used to better control the inside temperature of a dwelling intended for human occupation. Ideally such design and system will permit an efficient temperature control which can respond to daily, weekly and even seasonal variations and will be easy to use and cost effective to install. Further such a system will be able to usefully use even small amounts of energy such as can be harvested or recovered from heat recovery systems, that might otherwise be wasted. Lastly such a system can address the dynamic of the heat loss through a surface in an active way to limit the energy required to be supplied inside of the building.

SUMMARY OF THE INVENTION

The present invention is directed to simple yet highly efficient systems and methods to control an internal building temperature by controlling the heat loss through an exterior surface such as a wall of a building enclosure. By controlling the heat transfer rates through the wall the heat loss or gain from or to the outside environment can also be controlled thus maintaining the interior of the building at a desirable temperature, such as within a temperature range most suitable for human comfort. Furthermore the present invention is an active system in which the rate of heat loss or gain through an exterior surface such as a wall can be varied over time to suit the temperature difference between the inside and the outside. Such a system can, according to the present invention be fully automated to ensure that it is easy to operate and essentially invisible to the building occupant such as a homeowner while at the same time taking advantage of certain passive properties of materials such as the thermal inertia of a thermal mass.

The present invention considers the total energy requirement of heating a building on an annual basis, and identifies and recruits energy as needed from different sources. The total energy required depends upon the location of the building, the size of the building and its basic insulation value. In general the higher the total insulation value the less energy required, because the less energy is lost to the outside. But regardless of the location, size, or the insulation value the present invention can be used to reduce the energy used and costs associated with occupying such a building. The present invention comprehends that there will be a certain level of fixed heat energy input provided to the building by means of the occupation, which can be called fixed energy inputs. A further source of energy, according to the present invention is through heat recovery systems, located for example on the warm grey water and air exchange systems. This is low grade source of heat which can be used directly to reduce heating costs through a novel active distribution system. The next source of heat is a solar collector, the energy from which can be directly integrated into the novel distribution system. It is preferred if the total energy required can be met through the foregoing three sources, however the present invention also comprehends having a back up heat source as may be desired. The present invention provides a way for such low level heat energy to be used in an active way to control the heat loss through an surface such as a wall and thus permits such low level heat energy to be used to reduce overall energy demand for the heating or cooling of the building to keep the temperature within the optimum temperature range for human habitation.

Thus the present invention is directed to, among other things, a novel distribution system which includes one or more dynamic walls on the building structure, where a dynamic wall is considered to be a wall designed having an ability to vary the rate of heat exchange through the wall.

More specifically the present invention provides a wall having a thermal mass, insulated on both the outside and the inside, which thermal mass includes an embedded heat exchanger. Unlike the prior art systems which are placed on the exterior surface to harvest passive energy, the present invention provides the embedded heat exchanger inside of the thermal mass as a means to add or subtract thermal energy from the thermal mass of the wall itself, to dynamically regulate the heat loss/gain through the wall, by, in part, controlling the temperature difference between the inside and the outside. The thermal energy being added can come from any other source, including a passive source such as solar energy from solar collectors mounted on the roof or at another location on the building, such as for example, a solar loft built into the space above the garage. The thermal energy being removed can be dumped into a heat sink, located outside of the building, such as the ground. Through the use of the thermal mass within the wall energy can be easily accumulated within the wall allowing even low level waste energy to be collected from grey water or exhaust air for example and usefully added to the thermal mass to control heat loss.

Thus the present invention may be characterized as a dynamic wall in which the temperature of the thermal mass can be controlled, through the embedded heat exchanger, to raise or lower the temperature of the thermal mass by adding or subtracting heat to control the rate of heat transfer across the wall. In other words the present invention provides that energy can be both put into the thermal mass or taken out of the thermal mass to better deal with the difference between outside and the inside temperatures. The present invention further provides that the thermal mass be very well insulated as explained in more detail below, on both the internal and external surfaces to slow down heat transfer through the wall. The present invention further provides that the temperature of the wall can be varied in advance of a temperature change outside to improve performance of the heat balancing to maintain efficient and comfortable inside temperatures.

The present invention further provides that the dynamic wall can be provided with more insulation on the inside wall and less on the outside wall. In a preferred embodiment the insulation values of the inside is about twice the insulation value of the outside insulation (not counting the thermal mass itself). The dynamic wall can be designed for various weather conditions and can be provided with a greater or smaller heat capacity depending upon the average annual weather patterns to which the building will be subjected.

In summary the present invention provides a system where a modest amount of passive heating, from for example solar energy, can substantially meet the heating needs of the building located in a northern climate. Similarly, the cooling needs can be substantially met from for example a ground loop to dump excess heat absorbed into the wall and removed by means of the wall embedded heat exchanger before the same can pass through the wall to heat the interior of the building.

Therefore according to a first aspect of the invention there is provided a wall for a building comprising:
 a. a first insulating layer on an interior surface of said wall;
 b. a thermal mass adjacent to said first insulating layer;
 c. a second insulating layer on an outside surface of said thermal mass;
 d. a heat exchanger operatively connected to said thermal mass to add or subtract heat from said thermal mass, and
 e. a fluid circulation system to deliver heat exchange fluid to said heat exchanger in a controlled manner.

Further according to a second aspect of the present invention there is provided a method of controlling heat loss and heat gain through an exterior wall of a building wherein said wall includes an inner insulating layer, an outer insulating layer and a thermal mass located between the insulating layers, the thermal mass further including a heat exchanger operatively connected to said thermal mass for adding or subtracting heat, the method comprising the steps of:
 collecting energy in an energy collection system connected to said heat exchanger;
 transferring energy into or out of said thermal mass through said heat exchanger; and
 controlling the rate of energy transfer between said heat exchanger and said thermal mass to buffer the rate of heat transfer across said exterior wall between an inside and an outside.

According to a yet further aspect of the invention there is provided a heating and cooling system for a building comprising:

a passive source of heat energy;

a heat sink reservoir to store heat energy in;

a first heat exchange system operating a temperature of 15 degrees Celsius or less and being operatively connected to said reservoir;

a second heat exchange system operating at a temperature of above 15 degrees Celsius and being operatively connected to said reservoir;

a thermal mass wall being connected to said first heat exchanger system; and a central air conditioning unit connected to said second heat exchanger system for heating and cooling air circulating within said building.

BRIEF DESCRIPTION OF THE DRAWINGS

Reference will now be made to drawings of the invention which, by way of example only, illustrate preferred embodiments of the invention and in which.

DETAILED DESCRIPTION OF THE PREFERRED EMBODIMENTS

The present invention is directed to a building system and structure that can be used to greatly reduce the traditional fossil fuel energy demands of a building intended to be occupied by humans, by effectively applying small amounts of heating or cooling energy to thermally dynamic and highly insulated wall structures. For any building system the heat balance equation can be expressed as $Q = A_x/R_C \times \Delta T$. In this expression, Q represents the total heat loss from the system through all of the exterior surfaces of the structure. $A_x$ is the area of any surface through which heat is being lost. $\Delta T$ is the temperature difference across the barrier. $R_C$ is the thermal resistance to heat flow through the barrier.

As will be understood by those skilled in the art, $A_x$ is a function of the design of the building and cannot really be changed too much. The most efficient shape, from a heat loss point of view, is a cube, which has the smallest surface area to internal volume, but that is not very pleasing aesthetically for a residential dwelling and so other shapes of building design must also be comprehended. Regardless of the shape of the building, it will have a total surface area which will account for substantially all of the passive heat losses or gains from or to the structure from the external environment, apart from waste water and fresh air exchange or turnover.

As well, $R_C$ is determined by the amount of insulation provided. The present invention comprehends maximizing the insulation value to reduce the heat demand for the building. Of course there is a tradeoff between the cost of insulation and the benefit to be gained, but in general the more well insulated the better. Thus in some cases it may be desirable or necessary to increase the insulation values for the building as set out in more detail below.

The last element of the equation above is $\Delta T$ or the temperature difference between the inside and the outside across the external surface or wall. The present invention is directed to providing dynamic control of the internal wall mass temperature to control the change in temperature and to effectively vary and thus control the rate of heat loss or gain. By adding or subtracting heat energy, as explained in more detail below, effective temperature control within the building can be had for a minimal energy input.

Figure 1:
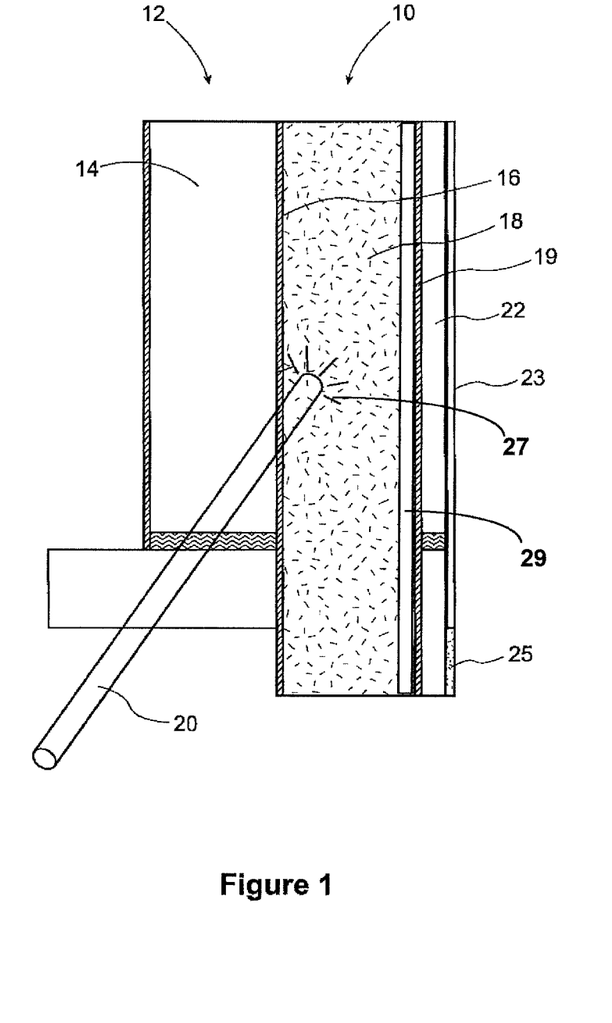
FIG. 1 illustrates a preferred embodiment of a dynamic wall according to the present invention.

FIG. 1 shows a portion of a dynamic wall 10 according to the present invention in cross sectional view. The wall consists of a number of sections, from inside to outside as follows: a normal six inch frame wall 12 with a first insulation layer of enhanced insulation 14, a light metal sheeting layer 16, a thermal mass 18 with an embedded heat exchanger 20 and an outer layer of insulation 22 (a second insulation layer). Between the thermal mass 18 and the second insulation layer 22 an internal sheathing layer 19 may also be provided, which might be plywood or other materials. An exterior finishing layer 23 can also be provided with parging 25 below grade as required. The frame wall 12 consists of normal framing elements and will be provided with typical insulation for example a total $R_C$ value of between $R_C$20 and $R_C$40 is most preferred. In the most preferred embodiment the ratio of the amount of insulation in the internal frame wall section to outside insulation is between about 4 to 1 and about 2 to 3, with about 60 to 40 being the most preferred at this geographic location, with for example the inside $R_C$ value (defined as the ratio between a temperature across a material and the rate of heat flux through the material) being 12 (BTU/square foot/degrees Celsius/hour) and the outside being 8 (BTU/square foot/degrees Celsius/hour). These values are preferred values and it will be appreciated by those skilled in the art that depending upon the prevailing weather conditions in which the building is located other $R_C$ values are also comprehended by the present invention. Essentially what is required is to provide sufficient $R_C$ value to the wall in total to slow the rate of heat loss or gain through the wall so that the heat flux through the wall can be countered by the use of an active system of low energy heating or cooling within the wall and using the thermal inertia of the thermal mass within the wall as explained in more detail below.

Another element in the wall 10 comprehended by the present invention is an air gap 29 may also be used to limit the heat transfer between the inside and the outside of the wall and increases the effective R value of the compound wall structure. The thermal mass 18 is preferably a low strength concrete wall or block wall in which the spaces within the block wall have been filled with concrete or other mass to create the required amount of thermal mass. The exact size of the thermal mass will also vary depending upon the building location, and will be a function of the total heat flows through the wall which may be typical at that geographic location. However, a five inch thick concrete mass is believed to provide adequate results for a building located in Kingston, Ontario. However the present invention comprehends providing walls with concrete portions ranging from about 3 inches to about 12 inches thick or more, with about 3 inches to 6 inches being most preferred.

As noted above there is a daily fluctuation in temperature. In one aspect the thermal mass of the wall can be used to store heat during the day and then to release heat during the night to maintain an average temperature within the building. Also over time during a warming season the temperature of the wall can be gradually raised to store more and more heat and during a cooling season the temperature of the wall can be gradually lowered to release heat as needed. In this sense the thermal mass of the wall acts as a form of energy storage device.

Included within the thermal mass 18 in the wall 10 is an embedded heat exchange system 20 including a closed loop piping which carries a heat transfer fluid into and out of the wall and which can be circulated through the piping by means of a low speed pump or the like. The heat transfer fluid is referred to herein as warm liquor or cold liquor and any form of liquid can be used that is liquid at between about zero and 50 degrees C., although water solutions are believed to provide good results. The tubing can be any convenient form of piping such as copper, plastic or other long lasting materials that will provide leak free circulation and which is resistant to corrosion or decay in the presence of water for example. It will be appreciated that the heat flux into and out of the thermal mass within the wall has two independent routes, namely a natural passive heat flux through the wall because of a difference between and inside and outside temperatures and also as a dynamic or active heat flux as a result of the direct heating and cooling of the thermal mass through the heat exchange system. Thus the total amount of heat sink required in the thermal mass can vary, but the larger the mass the greater a storage capacity the wall will have to assist in maintaining a comfortable temperature within the dwelling, and the longer it will take to deplete the useful heating or cooling capacity provided by the thermal mass.

According to the present invention the piping is placed within the thermal mass in such a way to optimize the heat transfer between the piping and the thermal mass. Diffusers 27 or other elements can be associated with the piping to assist in heat transfer between the heat exchanger and the piping according to the present invention. As well the piping is placed in a sinuous path through the thermal mass to increase the surface area contact between the outer surface of the piping and the thermal mass to increase the amount of heat exchange. According to conventional thermodynamic principles the rate of heat exchange is a function of the temperature difference between the thermal mass and the heat exchange fluid, the amount of surface area of contact and the rate at which the heat exchange fluid is passed through the system. What is desired is a piping configuration which provides enough heat exchange to permit the transfer of heat into and out of the wall through the heat exchange system 20. Another factor is the rate of fluid velocity through the heat exchange system which is controlled through the use of speed controlled circulation pumps which are explained in more detail below.

Figure 2:
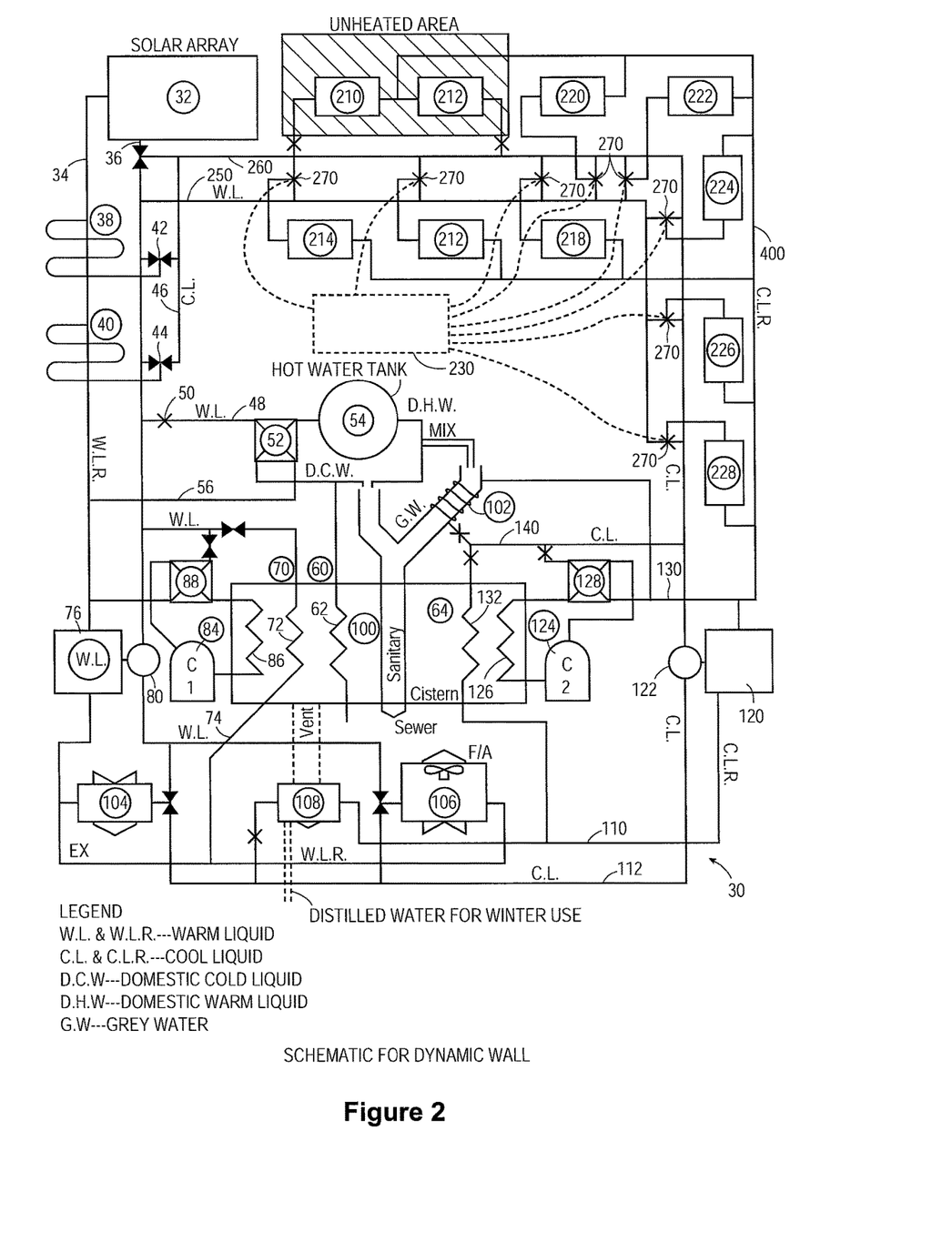
FIG. 2 illustrates a schematic of a building system incorporating a dynamic wall as set out in FIG. 1.

FIG. 2 illustrates a system schematic for a building system 30 according to one embodiment of the present invention. The system 30 includes a number of subsystems which are described below. According to this embodiment the present invention provides for two liquid circulation systems for redistributing energy around the building including a warm liquor system and a cool liquor system each of which are described in more detail below. Generally however, the warm liquor system operates at temperatures of between 20 to 50 degrees Celsius and the cool liquor system operates at a temperature of between 0 to 10 degrees Celsius in the winter and up to about 15 degrees Celsius in the summer. In general the warm liquor is above a room temperature of the dwelling and thus is a source of heat and the cool liquor is below the room temperature of the dwelling and is thus a source of cooling.

Each of the warm and cool liquor subsystems is comprised of a number of elements. For example a solar array 32 is shown with a warm liquor return line 34 and a warm liquor line 36. The most preferred form of solar array is one in which the solar energy is used to heat a fluid, such as a water glycol mixture. This is preferred over photovoltaic solar arrays for example, because of the inefficiencies and losses incurred in converting the sunlight into electrical energy and then converting the electrical energy back into heat energy. By harvesting the heat energy directly and then using the heat energy for heat, such conversions losses are avoided. Further the present invention allows the useful application of low temperature heat of the sort that might be produced under various conditions by such a solar array. However, the present invention comprehends also using photovoltaic's to provide electrical energy as desired for other purposes such as lighting or emergency heating or the like. However, the solar array 32 is a source of heat to add heat to the warm liquor circulation system, when the sun is shining.

The line 34 may be directed through heat exchange loops 38, 40 which are installed for example in floors of the dwelling. Note there is a connection at valves 42, 44 to a cool liquor line 46. This allows energy to be added or subtracted from the floors as needed, just by reversing the flow through the heat exchange loops to supply them with either cool liquor or warm liquor. Depending upon the direction of flow the liquid will be either warmed or cooled.

The line 48 is connected through valve 50 to a heat exchanger 52. The heat exchanger 52 is connected to the domestic hot water tank 54 and permits the heat of the warm liquor to be transferred into the domestic hot water tank 54. From there the cooled warm liquor is passed along line 56 to the warm liquor return line 34. Supplemental electrical or gas heating may also be used at the domestic hot water tank in some cases. Line 60 brings in potable city water to the heat exchanger 52 which has had its temperature modified by means of a heat exchanger 62 located within a cistern 64.

The present invention comprehends that the cistern could be any form of heat sink, but a liquid based heat sink is preferred. The idea is to retain or store heat energy when there is more than is needed and to later use up such energy as required to achieve comfortable living conditions. The use of the cistern allows for greater heat storage than can be provided in the thermal mass of the walls alone. Again, it is preferred to retain and store the energy in the same form that it is needed to avoid conversion losses. A cistern is one form of reservoir, but bladders, piping systems through thermal masses, phase change storage systems or other types of energy storage systems are also comprehended. What is required is an energy storage system that minimizes heat losses over time so the heat energy is available when needed, perhaps months later. Since heat loss is a function of the temperature difference, and surface area with a greater rate of heat transfer (loss) occurring with larger temperature differences it is preferred to use an insulated large sized heat storage means, having a relatively smaller absolute temperature rise to store the heat energy of the present invention. More specifically, the present invention comprehends that the heat captured and stored in summer can be available in the winter, several months later.

In addition to the line 48 there is a further line 70 which branches off the warm liquor line 36 which leads to a heat exchanger 72 located within the cistern 64. From there, line 74 leads the warm liquor return to a warm liquor tank 76. A pump 80 is connected to the warm liquor tank 76 to help drive the warm liquor around the plumbing loops just described. The most preferred pumps are small low energy pumps to circulate the fluids. For example the pump might be a 5 gpm@10 feet head pump or even a 2 gpm pumps@10 foot head type of pump.

At 84 there is shown a compressor to take energy from the cistern 64 and deposits it into the warm liquor by means of a closed loop including heat exchanger 86 and a warm liquor heat exchanger 88. The compressor 84 permits the temperature of the warm liquor to be raised above the temperature of the cistern energy source as may be needed for heating or the like. It will now be understood that the compressor 84 is really a heat pump which can raise the temperature of the reservoir fluid in the cistern 64 to the temperature of the warm liquor should that be required at any time.

Also shown in the middle of FIG. 2 are a sanitary sewer outlet 100 and an associated grey water heat recovery system 102. This is another way to scavenge low quality heat energy and to store it in the cistern 64 for future use.

There are also a few air systems that are comprehended by the present invention. At 104 there is a stale air exhaust outlet which is connected to both the warm and cool liquor lines to let the energy of the exhausting air be appropriately harvested. As will be understood by those skilled in the art any building enclosure designed for human occupation requires a certain amount of fresh air to supply oxygen and keep the occupants comfortable. Bringing in fresh air though requires the expulsion of stale air and the requirements for air turn-over per unit of time are set out in building codes and the like. To best harvest the heat energy in the exhausting air stream the present invention comprehends that, depending upon the temperature of the exhausting air, it might be more appropriate to use either the cool or the warm liquor to recover the energy in this waste air stream. At 106 there is a fresh air inlet also connected to both the warm and cool liquor systems. Again depending upon the temperature of the incoming air it may be appropriate to heat it with the warm liquor or to cool it with the cool liquor. Lastly at 108 there is a further air system comprising a cool plate condensation unit for air being vented off the cistern 64. This may for example provide a source of distilled water during the winter. Cool liquor return line 110 connects this condensation unit 108 to the cool liquor system, while cool liquor line 112 provides cool liquor to the unit 108.

Also shown are the cool liquor tank 120 and an associated pump 122. A compressor 124 is shown with an associated heat exchange loop 126 in the cistern 64 with a heat exchanger 128 that allows heat to be withdrawn from the cool liquor in line 130 and deposited in the cistern 64 through a line 140 that permits the cool liquor line to pass directly into the cistern 64 with a heat exchanger 132. It will now be understood that the compressor 124 is a heat pump which is capable of transferring the excess heat of the cool liquor to raise the temperature of the cistern or reservoir 64.

Returning now to the top of FIG. 2, there is shown three more lines. These are the warm liquor line 250, the cool liquor line 260 and the cool liquor return line 400. At 210 and 212 are two wall embedded heat exchangers which are located in an unheated area. In this way the section 210 and 214 can provide a source of cool liquor in some circumstances. In other cases it may be necessary to have a run through a local heat sink, such as an adjacent water source of ground loop to provide a cool liquor source. At 214, 216, 218, 220, 222, 224, 226 and 228 are embedded heat exchangers in thermal wall sections of the building that correspond to heated or occupied portions of the building. All of these wall sections may be referred to as dynamic wall sections. Between the lines 250 and 260 can be seen valves 270, which are used to divert the flow of the warm or cool liquor into the wall sections according to ambient conditions as explained in more detail below.

It can now be appreciated that the present invention provides a lower temperature cool liquor system which is capable of scavenging low level heat from various building systems including air exhaust and grey water exhaust as sources of energy that might otherwise be wasted. The present invention also provides a source of higher heat or warm liquor to provide higher temperatures than would be available with the cool liquor system alone. A central cistern 64 is used to store energy and compressor systems are provided on each of the warm and cool liquor systems to help transfer energy to and from the cistern to and from the cool and warm liquor systems as and when needed. Further the cool and warm liquor systems are provided with direct heat exchange into the cistern to allow them to deposit or withdraw the energy directly to the cistern in the appropriate circumstances.

It can now further be appreciated that the sources of cool and warm liquor can be used to divert heat to (winter) or from (summer) the walls of the building enclosure through the heat exchangers 214 to 228 noted above to change the rate of heat loss through the walls. In this way the temperature inside of the dwelling can be maintained at a comfortable temperature for human occupation without the need for excessive energy consumption. In fact the present invention provides a means to harvest heat energy in the summer and slowly use that energy over the winter to maintain the comfortable temperatures. Further, through the use of the cool liquor system the low temperature heat energy that is recovered can still be usefully used.

A controller 230 is also provided for the heating and cooling system of the present invention. The controller can be any form of simple electronic controller such as a programmable PCC. The three way valves 270 are used to permit the cool liquor and warm liquor systems to operate to warm or cool the thermal mass in the walls to a predetermined temperature. If the temperature gets above the desired temperature then the cool liquor flow is provided. If the temperature gets below the set temperature then the warm liquor flow is provided.

It can now be appreciated that the present invention provides a dynamic wall system that permits the cool liquor system to add and remove energy to the cistern and for the warm liquor system to both add and remove energy to the cistern at one end and to add or remove energy from the thermal wall at the other end. In this way the present invention provides for the ability to during a warming weather phase remove heat from the thermal mass of the walls and store the same in the cistern and during a cooling weather phase to remove heat from the cistern and warm the thermal mass within the walls. Therefore, in the event that the thermal mass with the walls is not able to balance the heat load between the day and the night, additional heating or cooling can be provided from the cistern to ensure that the comfortable temperature is maintained. In addition the present invention scavenges waste heat from other sources such as waste water and waste air and uses the same to contribute to the overall heat balance of the building. Lastly the present invention provides for additional direct sources of heating, such as through the solar array to add additional heat. In locations where the cooling load exceeds the heating load by a large margin the unheated wall sections may be replaced with a source of cooling, such as a ground loop where excess heat can be dumped rather than being added.

Figure 3:
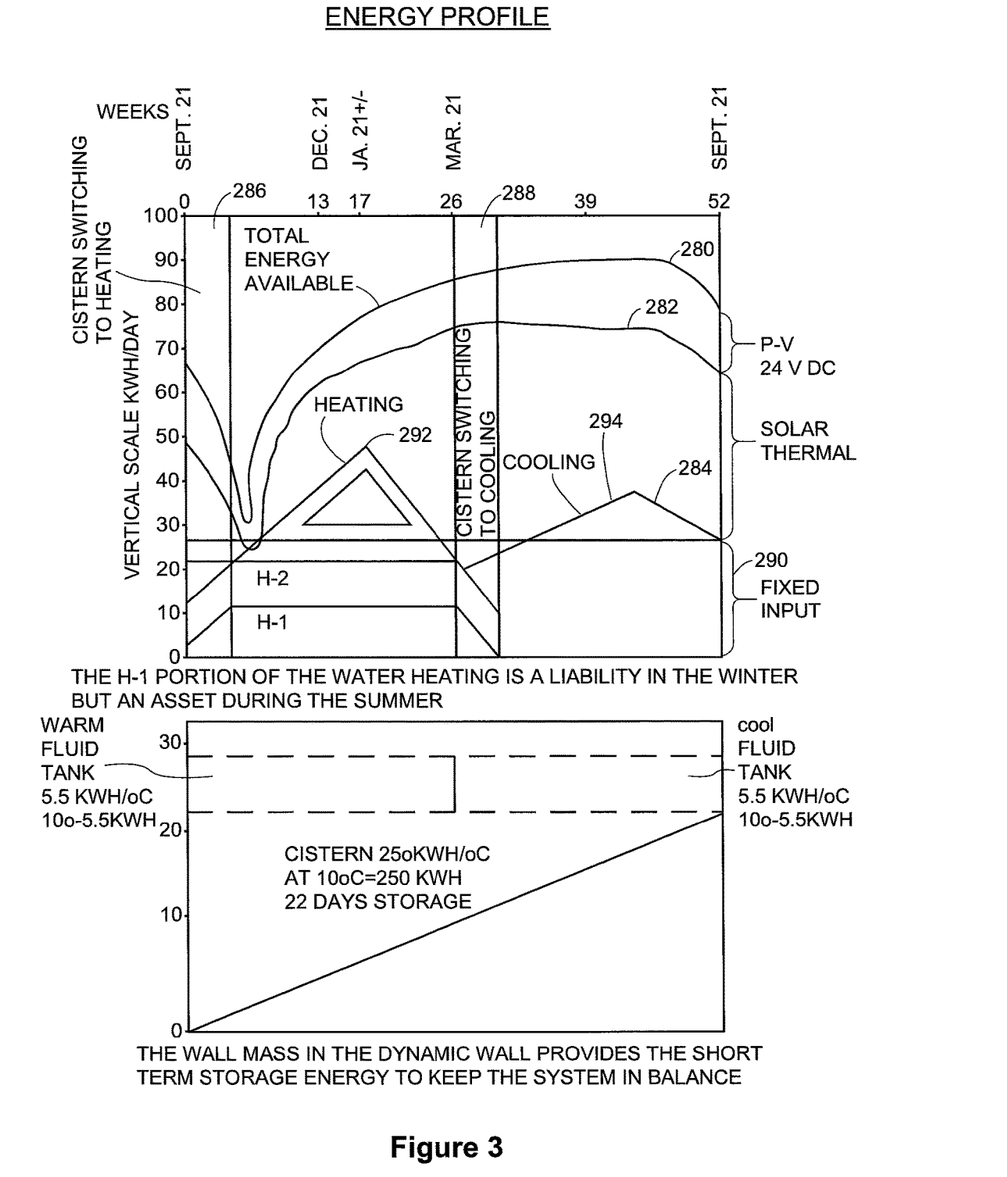
FIG. 3 illustrates a schematic of a daily temperature fluctuation for a sample location of Kingston, Ontario Canada.

FIG. 3 helps to illustrate the energy demands of a typical building. This is a plot of energy demand on the y axis (KWH/Day) vs. time on the x axis, over a 52 week period, for a location in Kingston Ontario Canada, with the origin of the x axis at September 21. Assuming the heat losses from a sample structure (identified in more detail below), the plot line 280 shows the total energy available over time. The plot line below it at 282 shows the total energy available without photovoltaic (i.e. with the solar thermal) and the plot line 284 shows the energy demands for heating and cooling in the winter and summer respectively. The zones 286 and 288 show the cistern switching to being used for heating and being used for cooling respectively. The fixed inputs are shown by the bracket 290 and include the energy used by the various appliances, including for example a hot water heater, heat pumps and compressors lighting and refrigeration and as well the people who occupy the home and give off some heat. The peaked plot line 292 shows the peak heat energy demand based on the outside temperature and assuming the heat loss from the sample building as aforesaid while the peak 294 shows the peak cooling energy demand. As can be seen for about one half of the typical year at this location there is a need for cooling. The position of the peak 294 will depend also on the preferred average room temperature. Keeping the internal temperature at 22° C. will require more cooling than keeping the average air temperature at 25° C., but there are personal comfort choices that will vary depending upon personal preferences.

The plot line 282 represents the contribution potential of the solar array assuming it to be 300 square feet at about 50% efficiency to provide 0.12 BTU/sq. ft./hr on minimum average to a maximum of about 6.54 BTU/sq. ft./hr on average. However these are estimates only and will vary with the location and the weather of course. The position, size and slope of any such solar panels will be optimized according to known principles. In this location a 60 inch slope will provide reasonable results. As will be appreciated there is always the possibility of an extreme weather event and so the present invention comprehends a back up source of energy may be required such as a gas or wood based combustion system to provide some extra heat capacity. However, it is noted that the total contribution required is estimated to be quite small. Such a backup system is desirable in any event in case of an extreme weather event which deviates from the average for a long period of time.

Figure 4:
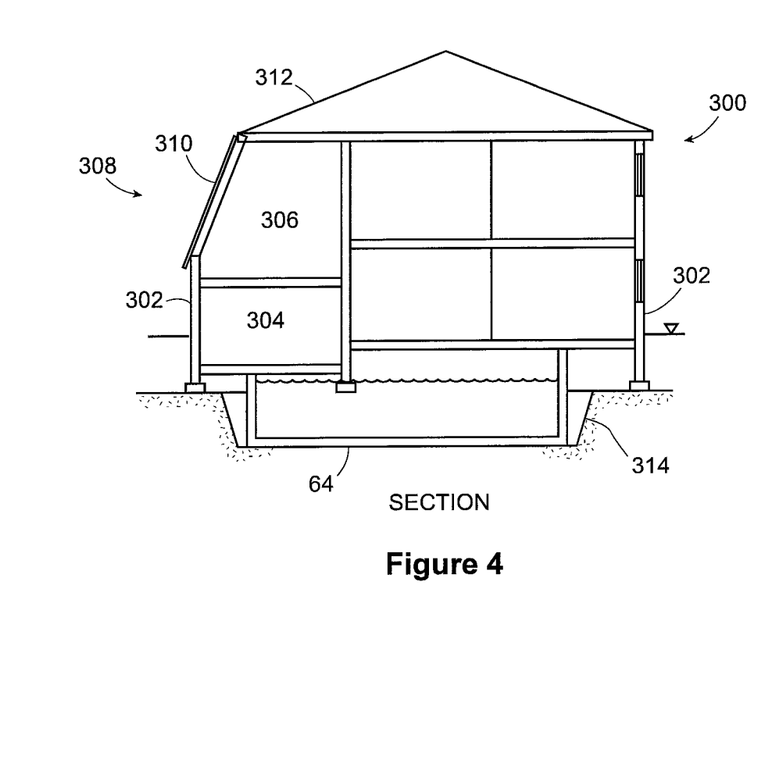
FIG. 4 shows a sample house building incorporating a dynamic wall system according to the present invention.

FIG. 4 is a side view illustration of a sample building 300, in this case a house, used by way of example to illustrate the features of the invention. The building 300 has walls 302, which are the dynamic walls previously described and illustrated in FIG. 1. In this embodiment they are 15 inches thick, with walls 36 feet long by 24 feet wide (inside measure). There is a garage 304 with a solar loft 306 provided on the south side 308. The solar loft 306 has solar panels 310 (referred to as 32 in FIG. 2) built into the roof 312 as shown above the garage 304. Although this configuration is preferred for ease of servicing the panels, for example from the inside, it will be appreciated by those skilled in the art that other building configurations are also comprehended, but this configuration is believed to provide good results. As well the reservoir 64 is shown in the basement 314. The building has a useable area of 1728 square feet with a dynamic wall area of 1970 square feet and a non-dynamic area of 864 feet of roof, 150 square feet of windows and 40 square feet of exterior doors. Floor to floor height is nine feet. The insulation value of the dynamic exterior wall is as previously described.

The operation of the system of the present invention can now be understood. The cool liquor system will operate at a temperature of less than 15 degrees Celsius and the warm liquor system will operate at a temperature range of between approximately 15 degrees Celsius and 20 degrees Celsius. The central repository for both systems will be the cistern 64, which acts as an energy storage bank to accept heat energy and to dispense heat energy to each of the cool and warm liquor systems via individual compressors. In this way the cistern 64 acts as a buffer for energy demand in the building. The primary purpose of the cool liquor system is to harvest heat energy from the air being vented to the outside, and grey water to provide heat flow between the dynamic wall and the reservoir. In some cases, for example when the outside temperature is cooler than the desired inside temperature, heat energy can be added to the wall, to reduce the heat loss directly from the building, and in other cases, when the temperature outside is higher than the desired inside temperature heat energy will be removed from the wall and deposited into the cistern 64. No matter what the temperature however, the cool water liquor system is recovering heat from internal building systems and depositing the same into the cistern 64 for when it might be needed later, thereby reducing the overall energy consumption of the building. As can now be appreciated the cool liquor system allows low temperature energy to be harvested, stored, and used directly to reduce heating costs, without any energy losses associated with any form of energy conversion. This is because to reduce energy losses through the dynamic wall of the present invention any heat energy input helps to reduce thermal losses and it does not need to be as high as room temperature to do so.

The dynamic wall includes certain features that are beneficial to its overall performance. One of these is a thermal mass that is large enough to retain heat over the daily temperature cycle, so that the warm day time temperatures are retained and gradually released over the night time period. Of course, the temperature cycle varies with the weather and the season, so this cannot be completely accurately sized. However, it can be sized to an average value and then the difference, caused by the weather, can be accommodated with the dynamic aspect of the system of the present invention which can add or subtract heat energy on demand.

The warm liquor system provides higher temperature heat energy, i.e. room temperature and higher, for use in applications within the building where such higher temperatures are required. Thus the warm liquor system can be used with a heat exchanger to heat the internal air of the building to room temperature as required. It also may be used to heat hot water for a domestic hot water tank, or other heating means, such as an electrical heater could also be used to heat the hot water. The main aspect of the warm liquor system is that it can be used for delivering higher temperature heat energy to fulfill specific needs within the building that cannot be met by the low temperature or cool liquor system.

It can now be appreciated that the present invention provides a means to buffer energy demand in the heating and cooling of a building enclosure by providing two storage sources for the energy and a means to transfer the energy from one storage source to the other over a range of operating temperatures. The two storage sources are the cistern 64 and the thermal mass within the dynamic walls. Further the present invention provides a means to deposit energy into the storage sources as well as take energy out of those sources most preferably through the use of two liquid exchange systems, with one of the systems being warmer and the other cooler as described above. The present invention further comprehends a controller with appropriate temperature and flow sensors for controlling the flow of liquids through the heat exchanger systems of the present invention to ensure a comfortable internal building temperature for human occupants.

Some of the features and benefits of the present invention can now be better understood. With the heat recovery storage and reuse of the present invention the total energy demand for heating the building enclosure is reduced by approximately 50 to 75% as compared to an existing energy demand from conventional building design. In addition, the peak energy demand or load, during the coldest days as well as the warmest days on the pubic energy grid is reduced by up to 40%, depending upon how many homes are outfitted with the present invention in any given area, reducing the need for additional power plants or the like supporting the grid. As well the present invention reduces the annual operating costs to home owners as well as significantly reducing the carbon footprint of their heating and cooling demands. Such a reduction will help reduce global warming and if the light of a carbon tax reduce the taxes paid by consumers.

While the foregoing description has been made with respect to preferred embodiments of the invention in which various embodiments have been described it will be understood by those skilled in the art that various other embodiments and alterations are possible without departing from the spirit of the invention as claimed in the attached claims. Some of these variations are discussed above and others will be apparent to those skilled in the art. For example, while preferred sizes and values are provided in this disclosure, these are by way of example only and other sizes and values can be used without departing from the spirit of the invention.

The embodiments of the invention in which an exclusive property or privilege is claimed are defined as follows:

1. A wall for a building comprising:
   a. a first insulating layer on an interior surface of said wall;
   b. a thermal mass adjacent to said first insulating layer;
   c. a second insulating layer on an outside surface of said thermal mass; and
   d. a heat exchanger operatively connected to said thermal mass to add or subtract heat energy from said thermal mass to vary the rate of heat flux across said wall;
   e. wherein said heat exchanger is connected to a warm liquor system and a cool liquor system, and heat energy can be added to said wall or taken from said wall through either one of said systems;
   f. wherein said warm liquor system is connected to a liquid reservoir by a first closed loop system including a compressor, a heat exchanger between the first closed loop system and the warm liquor system, and a heat exchanger between the first closed loop system and the liquid reservoir; and
   g. wherein said cool liquor system is connected to the liquid reservoir by a second closed loop system including a compressor, a heat exchanger between the second closed loop system and the cool liquor system, and a heat exchanger between the second closed loop system and the liquid reservoir.

2. The wall for said building as claimed in claim 1, wherein said wall includes an air gap to increase an R value for said wall.

3. The wall for said building as claimed in claim 1, wherein said wall further includes a metal sheeting layer, such that the outer surface of the metal sheeting layer is adjacent to said thermal mass, and the inner surface of the metal sheeting layer is adjacent to the first insulating layer of the wall.

4. The wall for said building as claimed in claim 1, wherein said wall includes an internal sheathing layer and an exterior finishing layer.

5. The wall for said building as claimed in claim 1, wherein said heat exchanger is in the form of a liquid carrying pipe embedded in said thermal mass and having a sinuous path to increase a surface area contact between said pipe and said thermal mass.

6. The wall for said building as claimed in claim 5, wherein said pipe further includes diffusers to encourage heat transfer between said heat exchanger and said thermal mass by increasing a heat exchange surface area.

7. The wall for said building as claimed in claim 1, wherein a ratio of the R value for said first insulating layer to the R value of said second insulating layer is between 4:1 and 2:3.

8. The wall for said building as claimed in claim 1, wherein said thermal mass is comprised of one or more of low strength concrete and concrete block.

9. The wall for said building as claimed in claim 1, wherein said warm liquor system further includes a solar collector array for absorbing warmth from the sun into said warm liquor system.

10. The wall for said building as claimed in claim 9, wherein each of said warm liquor system and said cool liquor system include a tank for temporarily storing said warm and cool liquor outside of said reservoir.

11. The wall for said building as claimed in claim 10, wherein said warm liquor system further includes a line which leads to a heat exchanger passing directly through the liquid reservoir.

12. The wall for said building as claimed in claim 10, wherein said cool liquor system further includes a line which leads to a heat exchanger passing directly through the liquid reservoir.

13. A method of controlling heat loss and heat gain through an exterior wall of a building, wherein said wall includes an inner insulating layer, an outer insulating layer, a thermal mass located between the insulating layers, and an air gap between the insulating layers, the thermal mass further including a heat exchanger operatively connected to said thermal mass for adding or subtracting heat to vary the rate of heat flux across said wall, the method comprising the steps of:
   collecting energy in an energy collection system connected to said heat exchanger;
   transferring energy between said thermal mass and said energy collection system through said heat exchanger; and
   controlling the rate of energy transfer between said energy collection system and said thermal mass to buffer the rate of heat transfer across said exterior wall between an inside and an outside;
   wherein the energy collection system comprises a warm liquor system and a cool liquor system, and heat energy can be added to said wall or taken from said wall through either one of said systems;
   wherein said warm liquor system is connected to a liquid reservoir by a first closed loop system including a compressor, a heat exchanger between the first closed loop system and the warm liquor system, and a heat exchanger between the first closed loop system and the liquid reservoir; and
   wherein said cool liquor system is connected to the liquid reservoir by a second closed loop system including a compressor, a heat exchanger between the second closed loop system and the cool liquor system, and a heat exchanger between the second closed loop system and the liquid reservoir.

14. A method of controlling heat loss and heat gain through said exterior wall of said building as claimed in claim 13, further including the step of collecting energy in said energy collection system through a solar collector.

15. A method of controlling heat loss and heat gain through said exterior wall of said building as claimed in claim 13, further including the step of collecting energy in said energy collection system through an exhaust air heat recovery collector.

16. A method of controlling heat loss and heat gain through said exterior wall of said building as claimed in claim 13, further including the step of increasing a temperature of said reservoir in said energy collecting system to store excess heat energy during a warming weather phase.

17. A method of controlling heat loss and heat gain through said exterior wall of said building as claimed in claim 16, further including the step of increasing a temperature in both said thermal mass and said reservoir to store excess heat energy during said warming weather phase.

18. A method of controlling heat loss and heat gain through said exterior wall of said building as claimed in claim 13, further including the step of decreasing a temperature of said reservoir in said energy collecting system to compensate for heat lost from said wall during a cooling weather phase.

19. A method of controlling heat loss and heat gain through said exterior wall of said building as claimed in claim 13, further including the step of decreasing a temperature of said reservoir and said thermal mass in said energy collecting system to compensate for heat lost from said thermal mass during a cooling weather phase.

20. A method of controlling heat loss and heat gain through said exterior wall of said building as claimed in claim 13, further including the step of using a controller to sense a temperature of said dwelling and to direct warm liquor or cool liquor to said wall to preserve said temperature.

21. A method of controlling heat loss and heat gain through said exterior wall of said building as claimed in claim 20, further including the step of pre-heating or pre-cooling said thermal mass in said wall in advance of an anticipated external temperature change.

22. A heating and cooling system for a building comprising:
   at least one passive source of heat energy;
   a insulated liquid reservoir to store heat energy in;
   a warm liquor system operating at a temperature of 20 to 50 degrees Celsius, and operatively connected to said insulated liquid reservoir by a first closed loop system that includes (i) a compressor, (ii) a heat exchanger between the first closed loop system and the warm liquor system, and (iii) a heat exchanger between the first closed loop system and the reservoir;
   a cool liquor system operating at a temperature of 0 to 15 degrees Celsius, and operatively connected to said insulated liquid reservoir by a second closed loop system that includes (i) a compressor, (ii) a heat exchanger between the second closed loop system and the cool liquor system, and (iii) a heat exchanger between the second closed loop system and the reservoir;
   a thermal mass within a wall being connected to said insulated reservoir by both said cool liquor system and said warm liquor system; and
   a central control for controlling the flow of liquids through said heat exchangers to maintain a predetermined temperature within said building enclosure.

* * * * *